March 27, 1951      F. J. LLANSO      2,546,641
DRAFT CALCULATOR

Filed Jan. 1, 1947      2 Sheets-Sheet 1

INVENTOR.
FRANCISCO J. LLANSO
BY Richards + Geier
ATTORNEYS

March 27, 1951 F. J. LLANSO 2,546,641
DRAFT CALCULATOR

Filed Jan. 1, 1947 2 Sheets-Sheet 2

INVENTOR.
FRANCISCO J. LLANSO
BY *Richards & Geier*
ATTORNEYS

Patented Mar. 27, 1951

2,546,641

UNITED STATES PATENT OFFICE 2,546,641

DRAFT CALCULATOR

Francisco J. Llansó, Westwood, N. J.

Application July 1, 1947, Serial No. 758,369

9 Claims. (Cl. 235—61)

This invention relates to a device which will predict, determine, or control the fore and aft drafts of any ship afloat, and is intended for use in connection with the easy and accurate determination of drafts of ships. Specifically, this invention relates to improvements in existing instruments of this type.

At the present time, it is seldom that accurate predetermination of a ship's draft is figured by operating personnel chiefly because it involves lengthy mathematical calculations or requires expensive and delicate instruments. However, such data are important because upon it depend the efficient operation of the ship, safe navigation through channels and into harbors of known depth, and proper sea keeping qualities. Moreover, a proper determination of fore and aft drafts is frequently required in repair work as well as salvage operations.

It is an object of this invention to provide a rugged and simple device for the determination or control of the flotation drafts of vessels.

A further object is to provide a device that is independent of critical balance or fine reading scales.

Another object is to provide a device the accuracy of which will not be deranged by climatic changes.

It is also an object to provide a device easy for persons not versed in the mathematical intricacies of hydrostatic calculations involved in ship calculations to obtain the same results as can be obtained with such calculations.

Other objects will become apparent in the course of the following specification.

In the attainment of these objectives, two templates, hereinafter designated the draft change template or set of parallel calibrated scales and the inboard profile template are used along with two coacting draft indicating tapes. The draft change template or set of parallel calibrated scales has marked upon it in vertical columns graphical representations of the total draft change in hundreds of tons and subdivisions thereof occurring when a given weight is loaded or discharged at a correlative columnar position. Based upon the displacement curves of the ship's design, the spacing between the columnar indicia in each column will vary so that whenever the weight represented by a segment of the column, for example ¼ inch, is sufficient to cause a change of draft, the spacing between the indicia will have increased by ¼ inch. Thus, the parallel scales in the columns of the draft change are respectively calibrated in terms of predetermined loads at calibrated intervals along the scales representative of the displacement, to the same scale as the draft change tapes, caused at the related end of the ship. Approximately in the center, the template is divided by a heavy horizontal line termed the "No draft change line," and the total effect in draft change represented by the lengths of the columns along this line is zero. Wherever a column indicates a draft change at the fore end, the figures denoting tonnage within that column are in Arabic numerals, wherever the draft change is aft the figures are in Roman numerals.

The ship's inboard profile template is a drawing in schematic form of the ship's profile on which are drawn the cargo compartments, storerooms and the like for which when a weight is added to or removed therefrom the change of the ship's draft may be desired. Each section of such space which is represented on the draft change template or parallel calibrated curves by a draft change column is marked on the inboard profile template by solid vertical lines when the edge of the draft change column also marks the forward or after vertical boundary of a compartment or by dashed vertical lines when the edge of a draft change column is contained entirely within a compartment. The divisions on the ship's inboard profile template are so drawn that the columns in the tonnage-draft change template will match the spaces for which the columns are drawn when the former is slidably disposed over the latter in the manner hereinafter shown.

The two draft indicating tapes constructed of non-stretching fabric material or the like are endless tapes adapted to show directly the actual change in the ship's draft when used in conjunction with the previously mentioned templates as shown later. Feet and inches of ship's draft are marked at ¼ inch intervals along the edges of the tapes giving a range of draft between 9 and 21 feet along one edge and from 21 to 33 feet along the opposite edge. Arabic numerals indicate the change in draft at the fore end and Roman the change aft.

The draft change template or set of parallel calibrated scales is mounted on a flat base with its vertical columns parallel to the longitudinal center line of the base. The inboard profile chart is mounted on a slidable support with its ship location designations under the appropriate column in the tonnage-draft change template or set of parallel calibrated scales over which it moves longitudinally. The draft indicating tapes are mounted on either side of the base of the draft change template and are adapted to be moved with the slidable inboard profile template.

When determining the resulting draft arising from change of load, the draft indicating tapes are set at the designated draft marks prior to making the change. The inboard profile template is then moved up, if loading forward is the problem, to the designated tonnage in the draft change template indicated in the column above the location in which the loading is to take place. The draft indicating tape with the Arabic numerals is then pressed betwen the thumb and the slidable inboard profile chart and the draft indicating tape pulled back until the top edge of the inboard profile template is over the "No draft change line." The new reading on the tape at that line will be the new draft for the fore end under the new loading plan. Since every change in distribution of load in general changes the draft of both ends of the ship, to obtain the change of draft at the aft end, the inboard profile template, dependent upon the location, is moved down to the tonnage in the appropriate column showing the change of drafts in the aft end. By pressing the draft indicating tape with the Roman numerals with the thumb against the inboard profile chart, the tape is moved up to the "No draft change line" and the resulting figure on the tape will show the aft draft of the ship under the new load. Knowing the new fore and aft draft figures, the mean can readily be determined.

The invention will appear more clearly from the following detailed description when taken in connection with the accompanying drawing showing by way of example a preferred embodiment of the inventive idea.

Figure 1:
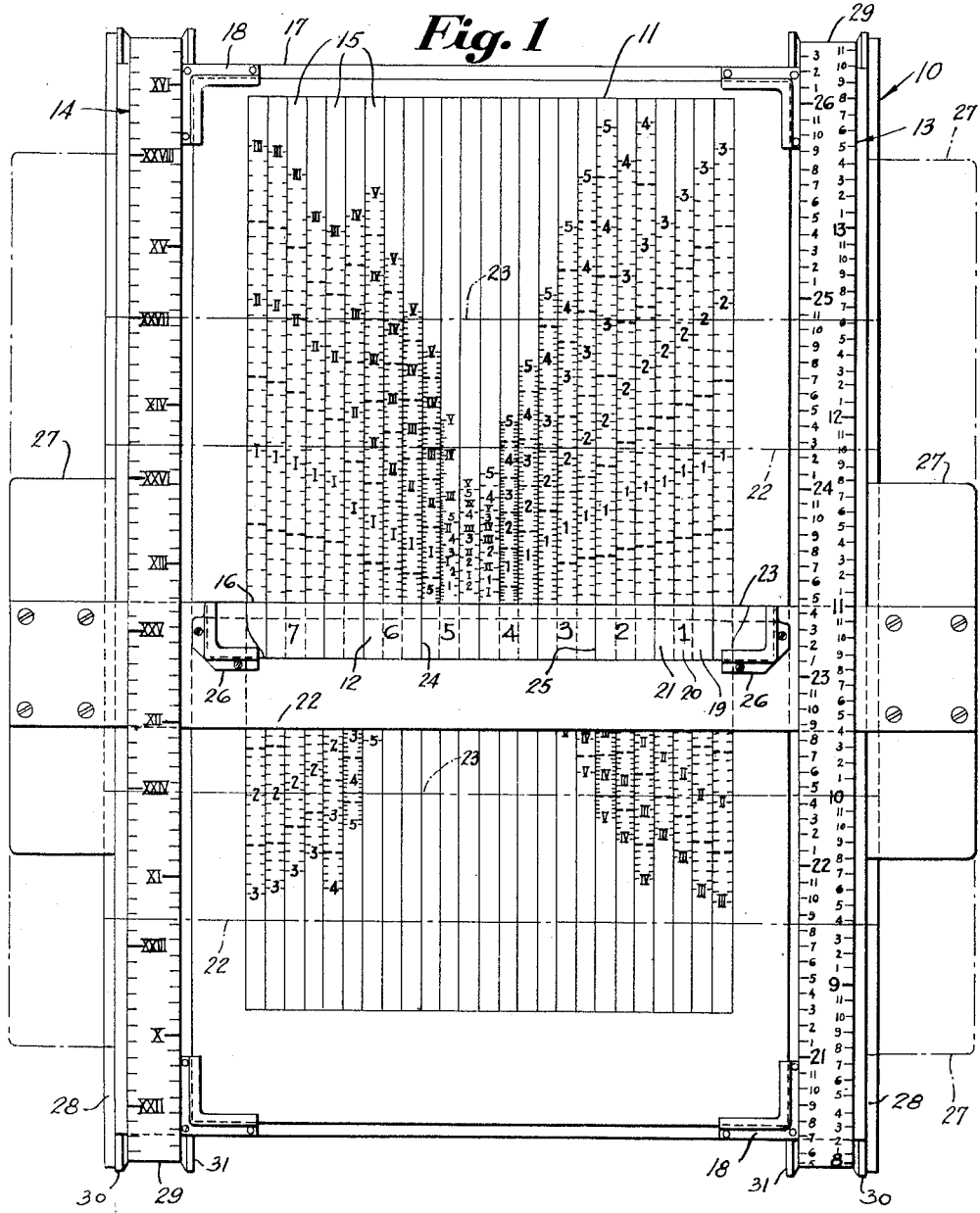
Figure 1 is a top plan view of the device for determining the draft of a floating ship under any load constructed in accordance with the principles of this invention.

Referring now in greater detail to the drawings in which like reference numerals indicate like parts, reference numeral 10 (Figs. 1 and 4) indicates the device for determining the draft of a floating ship under any load, 11 the draft change template or set of parallel calibrated scales, 12 the inboard profile template, 13 the draft indicating tape for the fore end of the ship, and 14 the draft indicating tape for the aft end of the ship.

The draft change template or set of parallel calibrated scales 11 may be made of plastic material, paper, or the like suitable for imprinting legible symbols and lines as hereinafter described. The template 11 is ruled off into the vertical columns 15 (Fig. 1), and the horizontal "No draft change line" 16. The columns 15 have marked upon them the effect of change of draft in hundreds of tons and subdivisions thereof. The space between the columnar indicia in each column varies so that whenever the weight represented by a segment of the column is sufficient to cause an actual change of draft of, for example, 1 inch, the spacing of the columnar indicia will increase by ¼ inch. Thus, the parallel scales in columns 15 of the draft change template 11 are respectively calibrated in terms of predetermined loads at calibrated intervals along the scales representative of the displacement, to the same scale as the draft change tapes 13 and 14, caused at the related end of the ship. There are sufficient columns 15 drawn on the template 11 so that each major cargo compartment, storeroom, tank, and the like or subdivision thereof is represented by a column. The number of columns is a variable dependent upon the vessel. Along the "No draft change line" 16 the result of draft change represented by the spacing of the indicia is zero. Whenever a column indicates a draft change at the fore end, the figures denoting tonnage within the columns are given in Arabic numerals, and whenever the change is at the aft end of the ship the numerals are Roman. In actual practice, all figures may be in Arabic and colors such as red and blue used to distinguish between fore and aft changes. It will be noted that on the draft change template 11, the Arabic numerals at the top right of the sheet are separated from the Roman numerals at the bottom by the "No draft change line" 16. At the left top of the template 11, it will be noted the graduations are in Roman numerals with Arabic numerals in the lower left corner. It will be further noted that approximately in the center of the sheet, both Arabic and Roman numerals are inserted above the "No draft change line" 16. The reason for the system adopted arises from the fact that at least in the fore and aft ends of the ship adding or subtracting weights has an opposite directional influence while approximately in the center the influence is in the same direction.

The draft change chart or set of parallel calibrated curves 11 is removably mounted on the base 17 which may be a drawing board or the like. The right angle supports 18 serve to hold the template 11 substantially parallel to the longitudinal center line of the base 17.

The ship's inboard profile template 12 may be a scaled down drawing of the ship's actual inboard profile but for all practical purposes may be a longitudinal sectional view of the ship in which distances between bulkhead forming the fore and aft transverse margins of the cargo holds and the like are equal throughout the ship. In Figure 1, the inboard profile chart 12 is divided into the compartments 1, 2, 3, 4, 5, 6, and 7, and each of the compartments divided into three equal parts as, for example, 19, 20, and 21 (Fig. 1). It has been found convenient to form the inboard profile template 12 of opaque white plastic which may be ground so that soft penciled figures may be written thereon and erased when operating the device as subsequently shown. The inboard profile template 12 is permanent for any given type ship.

The inboard profile template 12 is mounted in the sliding rule 22 with the upper edge 23 thereof approximately coinciding with the upper edge of the sliding rule 22 and its perpendicular divisional lines 24, 25, and the like aligned with the divisional lines of the previously described columns 15 of the draft change chart 11. Right angle supports 26 retain the template 12 in proper alignment and permits interchangeability at the user's will.

The drawer 32 is provided for storing templates when not in use.

The T members 27 are attached at either end of the sliding rule 12 and are adapted to move longitudinally along the tracks 28 on either side of the board to keep the rule 22 approximately at right angles to the longitudinal center line of the draft change template 11 over which it moves.

Figure 4:
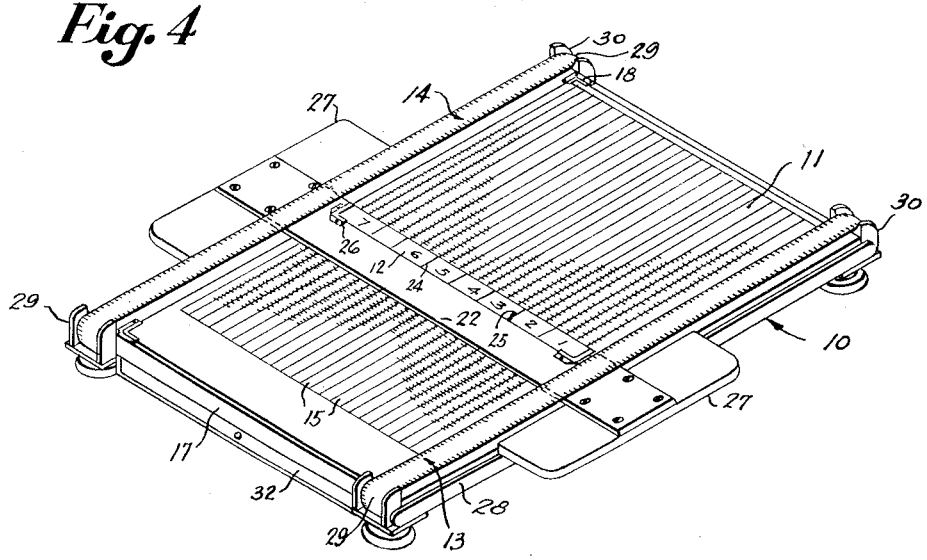
Figure 4 is a view in perspective of the device shown in Figure 1.
Figure 2:
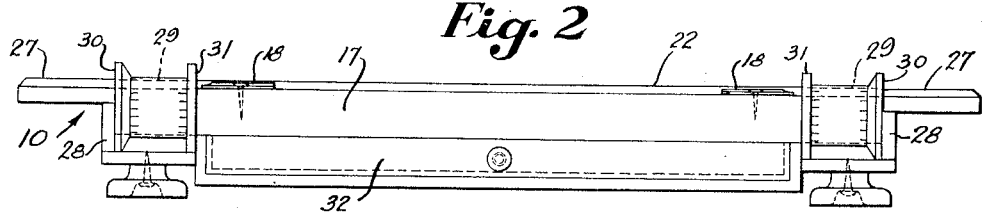
Figure 2 is an end view of the device shown in Figure 1.
Figure 3:
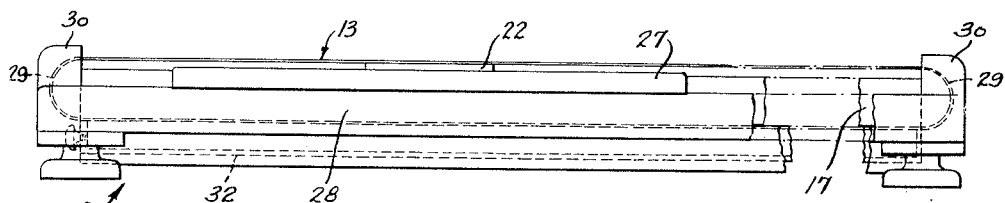
Figure 3 is a side view of the device shown in Figure 1.

The draft indicating tape 13 for the fore end of the ship and 14 for the aft end thereof are non-stretchable endless tapes of plastic, steel, or the like adapted to move over the guides 29 mounted along the top and bottom edges alongside the tracks 28. The guides 29 are half cylindrical sections with retaining flanges 30 and 31 at either side as shown in Figure 4 to prevent the tapes 13 and 14 from slipping off when pulled therearound. The guides 29, it will be noted, sufficiently elevate the tapes 13 and 14 from the planes of both the base 17 and the plane of the sliding rule 22 as to be free to be pulled around the guides 29 over the top surface portion of the sliding rule 22. The tapes are marked from 9' to 21' along one edge with feet-inch markings of draft, each inch of draft on the tape being spaced, for example, ¼" apart. At the 21' mark the draft shifts to the opposite edge of the tape and progresses to 33' of draft. In this way the length of the tape is used twice. As in the case of the draft change template 11, it is expected that the feet-inch markings will be in color, draft indicating tape 13 in that color corresponding to the fore end of the ship and draft indicating tape 14 in that color representative of the aft end of the ship. In Figures 1 and 4, Arabic numerals have been used to indicate the divisions along the edges of the tape 13, and Roman numerals the divisions along the edges of the tape 14.

The operation is as follows: Assuming that the proper draft change template 11, and inboard profile template 12 have been properly prepared for the ship under study and that the present draft of the ship at the fore end is 23 feet 1.5 inches, aft 25 feet 3 inches and it is desired to know the new draft fore and aft by adding 200 tons in the fore compartment of hold No. 1 and unloading 200 tons from the aft compartment of hold No. 7. Pressing the draft change tape 13 with the thumb against the sliding rule 22, pull the tape 13 around the supports 29 until the reading of the tape 13 along the "No draft change line" 16 is 23 feet 1.5 inches. Preferred practice requires that the draft indicating tapes always be moved in the manner stated. Move the draft indicating tape 14 in the same manner until the reading shows the assumed present draft of 25 feet 3 inches. Move the sliding rule 22 upward to the top dotted position shown in Figure 1 when the upper edge will cut through the Arabic number 2 aligned with the forward compartment of hold No. 1 on the ship's inboard profile template 12. Press the fore draft indicating tape 13 with the thumb and drag is back along with rule 22 to the "No draft change line" 16, the new reading on the tape at that line will be the new fore draft of the ship by adding 200 tons at the location given. However, the aft end of the ship is also influenced and to find the magnitude pull the sliding rule 22 below the "No draft change line" 16 until the top edge thereof cuts through the Roman II in the column aligned with the forward section of the No. 1 hold. Press the thumb against the draft change indicating tape 14 and pull it up, using the sliding rule 22, until the top edge of the rule is again over the "No draft change line" 16. The new reading will show the new draft aft by loading 200 tons as indicated. If the mean should be desired, it may readily be calculated. Removing 200 tons from the aft compartment of hold No. 7, involves the opposite procedure. With the upper edge of the sliding rule 22 over the "No draft change line," press the tape 14 thereagainst and move the two members upwardly until the upper edge of the sliding rule 22 or template intersects the Roman II of the columnar scale corresponding to the aft compartment of hold No. 7. The intersection of the "No draft change line" with the tape 14 moved to the new position will give the aft draft after loading 200 tons in hold No. 1 as previously explained and removing 200 tons from hold No. 7. To obtain the fore draft under the removed load, press the draft tape 13 against the rule or template 12 when the upper edge of the latter is over the "No draft change line" and pull the two members downwardly until the upper edge of the rule or template 12 intersects the Arabic 2 in the column corresponding to the aft compartment of hold No. 7 and below the "No draft change line." The intersection of the "No draft change line" with the tape 13 in the new position will give the fore draft of the ship under the cumulative effect of adding 200 tons to hold No. 1 in the fore of the ship and removing 200 tons from hold No. 7 at the aft.

In this way any number of weights can be handled in a continuous operation, supplying the user with a running account of the new fore and aft drafts being obtained. The device accumulates as it is operated providing a total indication at any time that the operator stops adding or subtracting weights to or from the ship. The permanent working parts of the device cause it to have wide application and can be made adaptable to any size or type of ship by the addition of simple templates characteristic of any particular ship. A ship's officer, concerned with one ship, may require only one set of templates. On the other hand, a port captain, stevedoring superintendent, or salvage chief may require templates suitable for several ships.

It is apparent the specific illustrations above shown have been given by way of illustration and not by way of limitation and that the structures above described are subject to wide variation and modification without departing from the scope or intent of the invention all of which variations and modifications are to be included within the scope of the present invention.

What is claimed is:

1. A device for indicating the draft of a ship under various loads in various positions, the device comprising a rectangular base member, a set of rectangular columnar scales supported by the base member, the scales being calibrated above and below a fixed line perpendicular to the scales in accordance with the displacement curves of the ship's design, means removably attaching the columnar scales to the base member with the columns parallel to the longitudinal edges thereof; an inboard profile template coacting with the columnar scales, and having lines thereon transversely dividing it to coact with the columnar scales, a slide carrying the template for sliding it over the scales parallel to the columns thereof with the transverse divisions superposed over the coacting columnar scales; two draft indicating tapes coacting with the scales and template slide, the tapes being in the form of endless belts and having draft scale indicia thereon correlated with the columnar scales, means slidably mounting one tape along one longitudinal edge of the base and over the template slide and the other along the opposite edge and over the template slide.

2. A device for indicating the draft of a ship under various loads in various positions according to claim 1 in which the means removably attaching the columnar scales to the base member comprises at least one right angle bracket disposed on the base member with the edges of the bracket parallel to adjacent edges of the base member and adapted for the releasable insertion of one corner of the set of rectangular calibrated scales.

3. A device for indicating the draft of a ship under various loads in various positions according to claim 1 in which the slide comprises means releasably attaching the template along the upper edge of the slide with the lines thereof aligned with the columnar scales.

4. A device for indicating the draft of a ship under various loads in various positions according a claim 1 comprising a member disposed on one end of the template slide and adapted to maintain the longitudinal edges of the template perpendicular to the longitudinal edges of the base member.

5. A device for indicating the draft of a ship under various loads in various positions according to claim 1 in which the means slidably mounting one tape along one longitudinal edge of the base and over the template slide and the other along the opposite edge and over the template slide comprises guides substantially in the form of half cylindrical sections disposed along the transverse edges of the base member at the corners and with the cylindrical portion of each turned outwardly.

6. A device for indicating the draft of a ship under various loads in various positions according to claim 5 in which the base member is characterized by having supports disposed on the bottom surface portion thereof whereby the draft indicating tapes may be moved freely around the guides.

7. A device for indicating the draft of a ship under various loads in various loading positions, the device comprising a set of columnar scales, the scales on one side being calibrated above a common zero index line transverse to the scales in accordance with predetermined loads at intervals representative of displacement in the fore draft in various fore positions of said ship and below the index line on the same side of the columnar scales in accordance with the same loads at intervals representative of displacement in the aft draft in the same fore positions; the scales being further divided above the index line on the opposite side in accordance with predetermined loads at intervals representative of displacement in the aft draft in various aft positions of said ship and below the index line on the same side of the scales in accordance with the same loads at intervals representative of displacement in the fore draft in the same aft positions, the device further comprising a base member supporting the columnar scales, a draft indicating tape for each side of the columnar scales and coacting therewith, the tapes having draft change indicia thereon on the same scale as said columnar scales, means supporting the tapes on the base member for movement parallel to the columnar scales, and means regulating the movements of the draft tapes in accordance with selected positions on the columnar draft scales.

8. A device for indicating the draft of a ship under various loads in various loading positions according to claim 7 in which the columnar scales above the index line on one side of the scales correlated with known changes in the fore draft under various loads in various fore positions of the ship are characterized by having Arabic numerals at each major division of the columnar scales above the index line and Roman numerals at each major division below said line on the same side of the scales; and further characterized by having Roman numerals at each major division above the index line on the opposite side of the scales and Arabic numerals at each major division below the index line on said opposite side of the scales.

9. A device for indicating the draft of a ship under various loads in various loading positions according to claim 7 in which the columnar scales indicating the changes in the fore and aft drafts of the ship are characterized by being color coded; and further characterized by having the correlated draft indicating tapes similarly color coded.

FRANCISCO J. LLANSÓ.

REFERENCES CITED

The following references are of record in the file of this patent:

UNITED STATES PATENTS

| Number | Name | Date |
|---|---|---|
| 578,149 | Isaacs | Mar. 2, 1897 |
| 1,201,205 | Legg | Oct. 10, 1916 |
| 1,277,723 | Hill | Sept. 3, 1918 |
| 1,383,492 | Seely | July 5, 1921 |
| 1,925,703 | Noyd | Sept. 5, 1933 |
| 2,193,280 | Gunning | Mar. 12, 1940 |

FOREIGN PATENTS

| Number | Country | Date |
|---|---|---|
| 309,309 | Great Britain | Apr. 11, 1929 |